(12) United States Patent
Daniel et al.

(10) Patent No.: US 8,894,021 B1
(45) Date of Patent: Nov. 25, 2014

(54) CABLE SUPPORT

(75) Inventors: Allan W. Daniel, Woodland, AL (US); Chad Garrish, Alto, GA (US); David Fuller, Lilbum, GA (US); Stuart W. Thorn, Chattanooga, TN (US)

(73) Assignee: Southwire Company, LLC, Carrollton, GA (US)

( * ) Notice: Subject to any disclaimer, the term of this patent is extended or adjusted under 35 U.S.C. 154(b) by 121 days.

(21) Appl. No.: 13/595,283

(22) Filed: Aug. 27, 2012

Related U.S. Application Data

(60) Provisional application No. 61/527,836, filed on Aug. 26, 2011.

(51) Int. Cl.
*F16L 3/08* (2006.01)

(52) U.S. Cl.
USPC ....... 248/74.3; 248/49; 166/77.51; 405/184.4

(58) Field of Classification Search
USPC .......... 248/49, 74.3, 74.1; 166/77.51; 175/85; 405/184.4
See application file for complete search history.

(56) References Cited

U.S. PATENT DOCUMENTS

| | | | | |
|---|---|---|---|---|
| 1,442,749 A * | 1/1923 | Tucker | ........................... | 126/318 |
| 2,550,001 A * | 4/1951 | Button | ............................. | 248/49 |
| 2,632,217 A * | 3/1953 | Flora | ........................... | 24/16 PB |
| 3,568,455 A * | 3/1971 | McLaughlin et al. | ......... | 5/184.4 |
| 3,700,197 A * | 10/1972 | Branton | ........................... | 248/71 |
| 3,797,260 A * | 3/1974 | Webb | ............................. | 405/172 |
| 3,805,646 A * | 4/1974 | Knight | ............................. | 81/69 |
| 4,678,147 A * | 7/1987 | Barnes et al. | ................ | 248/74.1 |
| 4,813,105 A * | 3/1989 | Espinoza | .................... | 24/16 PB |
| 4,885,963 A * | 12/1989 | Nishikawa | ................... | 81/57.32 |
| 5,123,484 A * | 6/1992 | Bode | ......................... | 166/77.51 |
| 6,460,634 B1 * | 10/2002 | Hart et al. | ....................... | 175/85 |
| 6,829,968 B2 * | 12/2004 | Hauk et al. | ................... | 81/57.16 |
| 7,392,967 B2 * | 7/2008 | Liaw et al. | ................ | 248/218.4 |
| 8,511,623 B1 * | 8/2013 | Shiner et al. | .................... | 248/49 |

OTHER PUBLICATIONS

O-Z/Gedney, "Cable Supports", http://www.emersonindustrial.com/en-US/documentcenter/EGSElectricalGroup/products_documents/commercial_products/commercial_fitting/rigid_imc_fitting/cable_supports/OZGEDNEY_Cable_Supports.pdf, 2007 (accessed May 23, 2013) (16 pages).

* cited by examiner

*Primary Examiner* — Bradley Duckworth
(74) *Attorney, Agent, or Firm* — Merchant & Gould

(57) ABSTRACT

A cable support is disclosed. The cable support may comprise a mount, a drive support, a strap, and a drive block. The drive support and the strap may be connected to the mount. The drive block may be connected to the drive support and the strap. A cable support may comprise a body having a through hole, a plurality of compression segments, and a spreader. The plurality of compression segments may be located at least partially within the body and may be sized to receive a wire. The spreader may be located between the plurality of compression segments.

20 Claims, 6 Drawing Sheets

US 8,894,021 B1

CABLE SUPPORT

CROSS-REFERENCE TO RELATED APPLICATIONS

The current application claims priority to U.S. Provisional Application No. 61/527,836, filed on Aug. 26, 2011 of which is hereby incorporated by reference in its entirety.

COPYRIGHTS

All rights, including copyrights, in the material included herein are vested in and the property of the Applicants. The Applicants retain and reserve all rights in the material included herein, and grant permission to reproduce the material only in connection with reproduction of the granted patent and for no other purpose.

BACKGROUND

FIG. 1 shows a conventional cable support 100. Cable support 100 is currently used by an electrician to secure cables (e.g., a first cable 102, a second cable 104, and a third cable 106). Cable support 100 comprises an outer connector 108, an inner sleeve 110, and an insert 112. Out connector 108 contains a threaded portion 114 that connects to a conduit connection (not shown) and a ledge 116 that supports inner sleeve 110.

Installing cable support 100 is an extremely inefficient process. This is because before cable support 100 can be installed the electrician must first install first cable 102, second cable 104, and third cable 106. Once first cable 102, second cable 104, and third cable 106 are installed, the electrician measures the diameters of first cable 102, second cable 104, and third cable 106. After measuring the diameters, the electrician then orders cable support 100. The electrician must first install and measure the diameters because insert 112 is custom made. Thus, the electrician must provide the manufacturer with exact diameters and a conduit size for every connection that uses cable support 100 and insert 112. As a result, the electrician must spend extra time measuring diameters, ordering cable support 100, and revising the connection to install cable support 100 after it is custom manufactured.

BRIEF DESCRIPTION OF THE DRAWINGS

The accompanying drawings, which are incorporated in and constitute a part of this disclosure, illustrate various embodiments of the present invention. In the drawings.

DESCRIPTION

Figure 1:
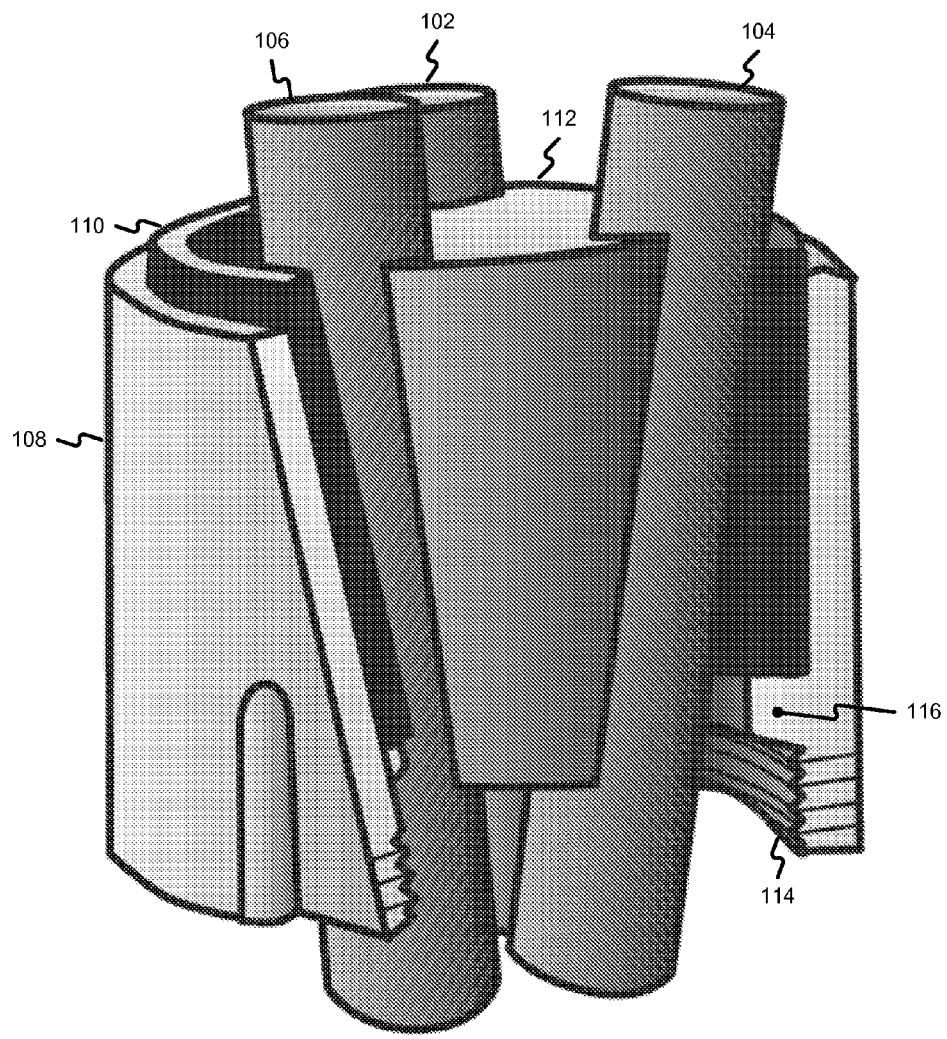
FIG. 1 shows a prior art cable support.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

A cable support is disclosed. The cable support may comprise a mount, a drive support, a strap, and a drive block. The drive support and the strap may be connected to the mount. The drive block may be connected to the drive support and the strap.

The drive block may be movable. Movement of the drive block may cause the strap to tighten or loosen around a cable or cable set. For example, the drive block may be operably connected to the drive support with a bolt. When the bolt rotates, the drive block may traverse along the bolt's axis of rotation. As a result, when the drive bolt turns, the strap may tighten or loosen around a cable or cable set. The tightening or loosening may support the cable or cable set and may lock it in place.

A cable support may comprise a body having a through hole, a plurality of compression segments, and a spreader. The plurality of compression segments may be located at least partially within the body and may be sized to receive a wire. The spreader may be located between the plurality of compression segments.

During installation, wires may be located between the body and the plurality of compression segments. The spreader may press the plurality of compression segments outward radially. The wires may be compressed between the compression segments and the body.

In contrast to the prior art, the various components of the cable supports may be standard parts that an electrician may stock. As such, the electrician may notice increased efficiency. The increase efficiency may be realized because the electrician may not be required to first install wires, measure conduit and insert sizes, wait for the inserts to be custom manufactured, and then return to the jobsite and install the cable supports.

Figure 2:
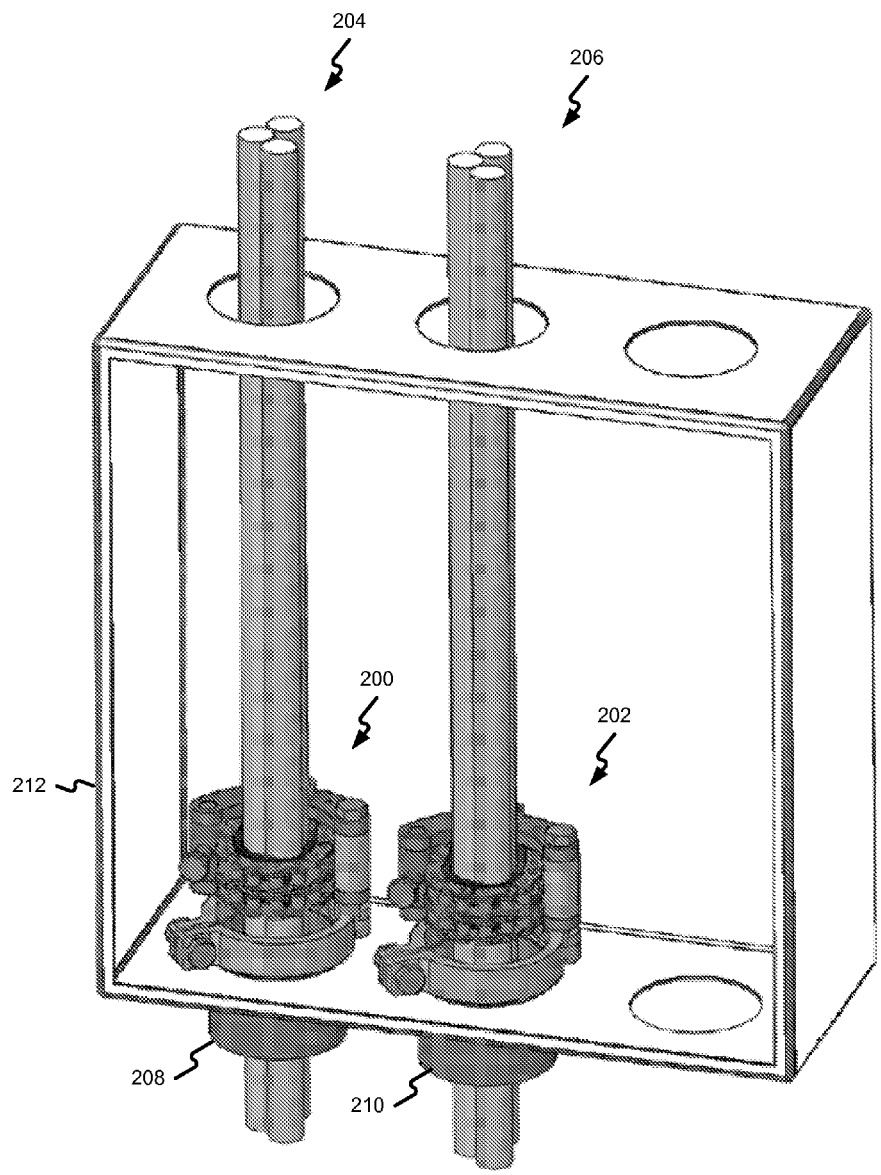
FIG. 2 shows an electrical connection.

FIG. 2 shows an operating environment for a first cable support 200 and a second cable support 202. Consistent with embodiments of the invention, a first cable set 204 and a second cable set 206 may pass through a first conduit 208 and a second conduit 210, respectively. First conduit 206 and second conduit 208 may pass through holes located in box 212. First cable support 200 and second cable support 202 may be connected to first conduit 206 and second conduit 208, respectively, as described in greater detail below with respect to FIG. 3.

Figure 3:
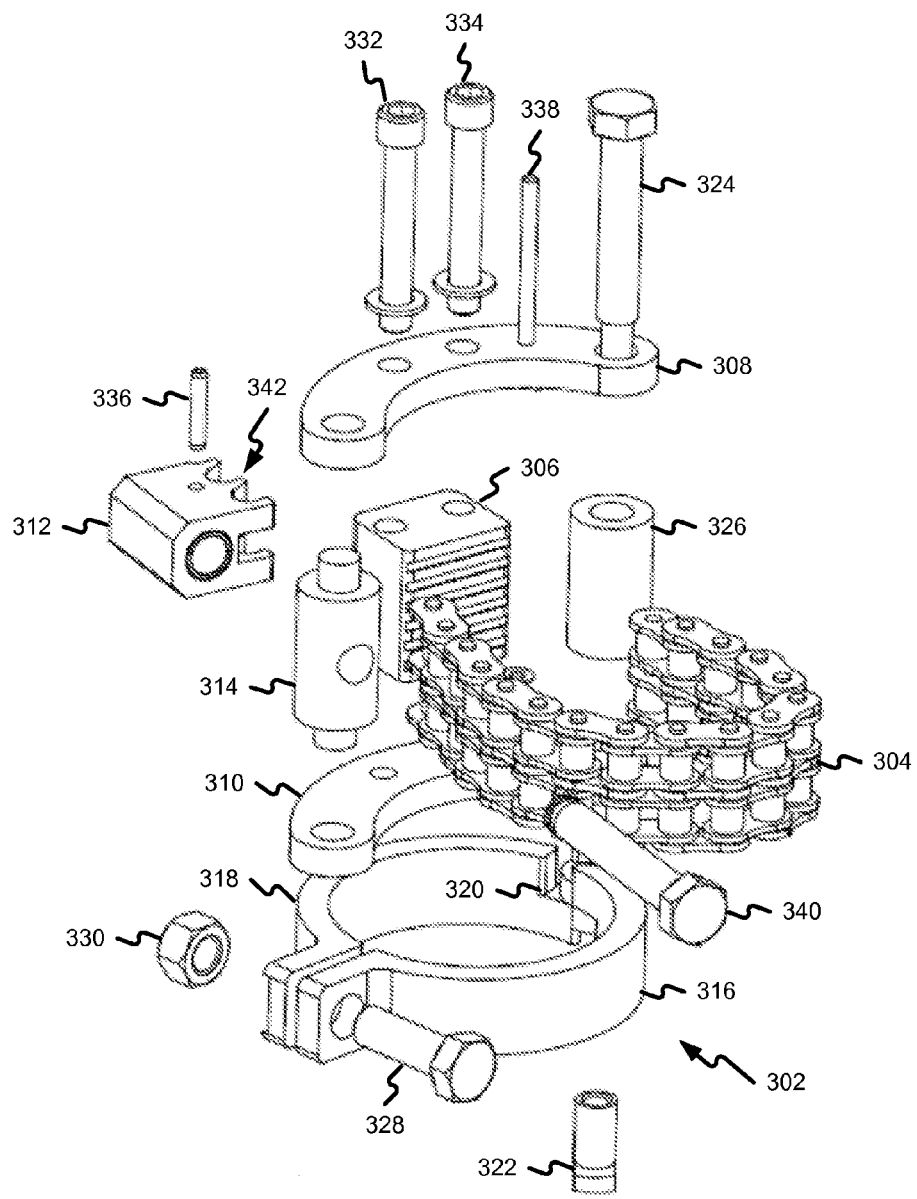
FIG. 3 shows an exploded view of a cable support.

FIG. 3 shows first cable support 200. Consistent with embodiments of the invention, first cable support 200 may comprise a clamp 302, a strap 304, a spacer block 306, an upper mount 308, a lower mount 310, a drive block 312, and a drive support 314. Clamp 302 may attach to first conduit 208. For example, clamp 302 may comprise a threaded portion that may attach to first conduit 208. In addition, and as shown in FIG. 3, clamp 302 may comprise a front portion 316 and a rear portion 318. Front portion 316 and rear portion 318 may be connected to each other using a hinge 320. Hinge 320 may comprise a hinge nut 322 that may receive a spacer bolt 324. In addition, a hinge spacer 326 may provide additional support. During installation, the electrician may bolt (using a clamp bolt 328 and a clamp nut 330) front portion 316 and rear portion 318 around first conduit 208, which may form a ground connection. Consistent with embodiments of the invention, rear portion 318 may contain a threaded portion that clamp bolt 328 may engage instead of using clamp nut 330.

Lower mount 310 may act as a base that cable support 200 may be built upon. For example, lower mount 310 may be attached to clamp 302 (e.g., to rear portion 318). In addition, lower mount 310 may be integrated into clamp 302. In other words, consistent with embodiments of the invention, lower mount 310 and clamp 302 may be one single piece or multiple pieces.

Spacer block 306 may be located between lower mount 310 and upper mount 308. While FIG. 3 shows spacer block 306 being held in place by a first screw 332 and a second screw 334, spacer block 306 may be held in place by other processes such as, for example, welding and adhesives. In addition, spacer block 306 may be integrated into lower mount 310 and/or clamp 302. In other words, consistent with embodiments of the invention, spacer block 306, lower mount 310, and/or clamp 302 may be one single piece or multiple pieces. Furthermore, a hinge spacer 326 may be used to provide additional support and secured by a spacer bolt 324.

Strap 304 may be connected to lower mount 310, upper mount 308, spacer block 306, and/or clamp 302. For example, strap 304 may be secured between lower mount 310 and upper mount 308 by a strap retention pin 338.

Drive block 312 may be connected to drive support 314 by a drive bolt 340 and a roll pin 336. Drive support 314 may contain threads that may engage threads located on drive bolt 340. When drive bolt 340 is rotated, drive block 312 may traverse along drive bolt 340's axis of rotation. Drive block 312 may include a gripping surface 342. Gripping surface 342 may engage strap 304. Thus, as drive bolt 340 is rotated and drive block 312 traverses, strap 304 may grip first cable set 202.

Strap 304, while shown as a chain in FIG. 3, may comprise other materials flexible materials such as a fabric, a plastic, a webbing material, a rope, and a wire. When strap 304 includes a metallic material, it may be desirable to cover strap 304 with a protective strip 400 (described below in FIG. 4).

Having strap 304 be adjustable, may allow cable support 200 to be used on various size cables. For example, because strap 304 may be adjusted, cable support 200 may be useable for larger diameter cables as well as smaller diameter cables. In addition, because strap 304 may be adjusted, cable support 200 may be usable with a differing numbers of cables. For instance, cable support 200 may be used with a cable bundle comprising a single cable, two cables, or any number of cables. In addition, cable support 200 may not have to be custom made. Furthermore, electricians may be able to purchase cable support 200 prior to installing cables.

Figure 4:
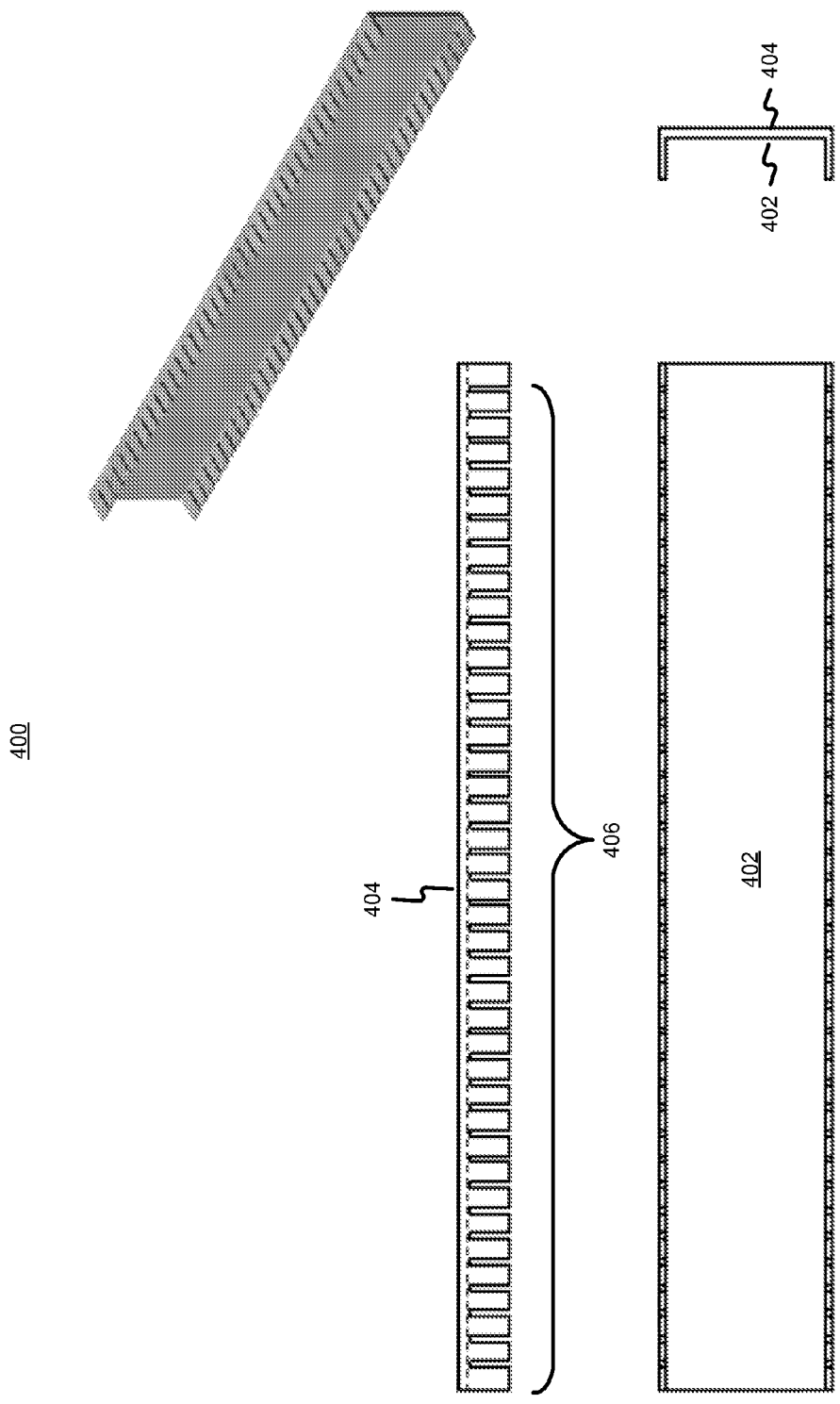
FIG. 4 shows a protective strip.

FIG. 4 shows a protective strip 400. Protective strip 400 may comprise an inner surface 402, an outer surface 404, and a plurality of flanges 406. Consistent with embodiments of the invention, protective strip 400 may comprise a non-conductive material. Examples of the non-conductive materials may include, plastics, polymers, ceramics, and fabrics.

As stated above, protective strip 400 may be used to protect first cable set 204. If strap 304 is made of a conductive material, an electrical hazard may be created. For example, during installation of cable support 200, strap 304 may be tightened to a point that it may cut into first cable set 204's insulation. This condition could cause arcing (i.e., a fire hazard) or electrification of cable support 200 (i.e., the potential for electrocution).

During installation, inner surface 402 may be placed against the inner portion of strap 304. Plurality of flanges 406 may grip strap 304 and may secure protective strip 400 to strap 304. Plurality of flanges 406 may also allow protective strip 400 to bend. Protective strip 400's ability to bend may allow it to conform to cables of various diameters or to groups of cables.

Figure 5:
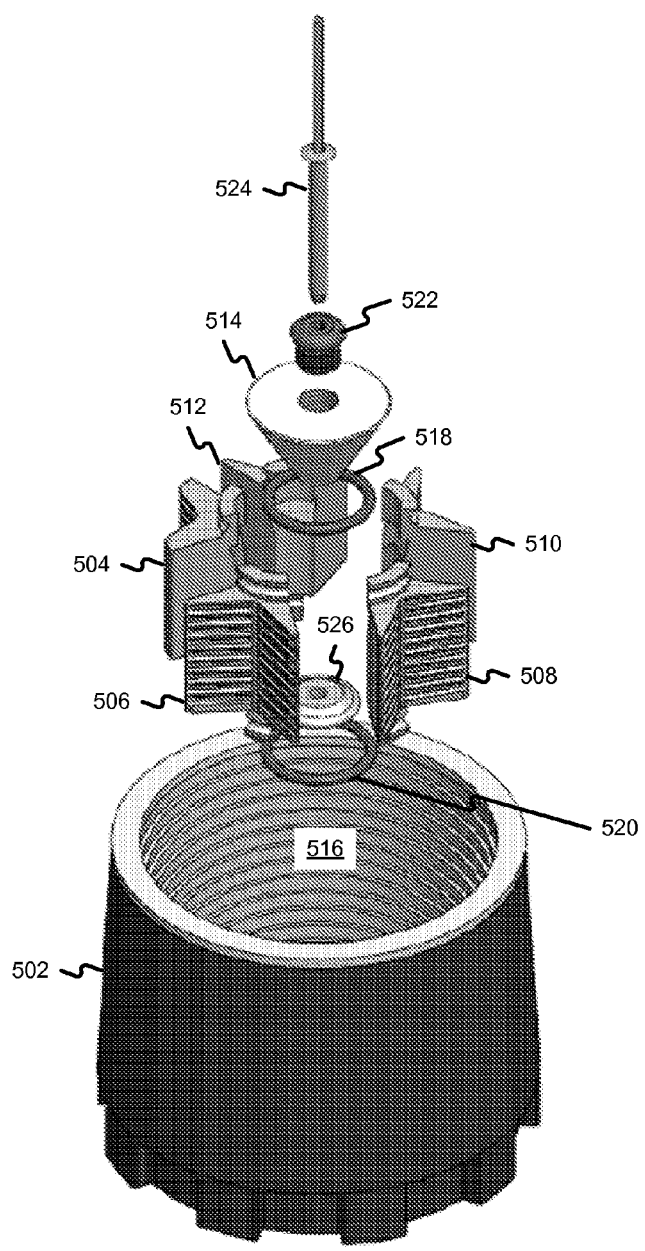
FIG. 5 shows an exploded view of a cable support.

FIG. 5 shows an exploded view of a cable support 500. Cable support 500 may comprise a body 502, a plurality of compression segments (e.g., a first compression segment 504, a second compression segment 506, a third compression segment 508, a fourth compression segment 510, and a fifth compression segment 512), and a spreader 514. Body 502 may include through hole that may comprise a surface feature (e.g., a protrusion or grooves 516. Each of the plurality of compression segments may also include surface features. The surface features may assist body 502 and/or the plurality of compression segments grip a wire passing through cable support 500.

Figure 6:
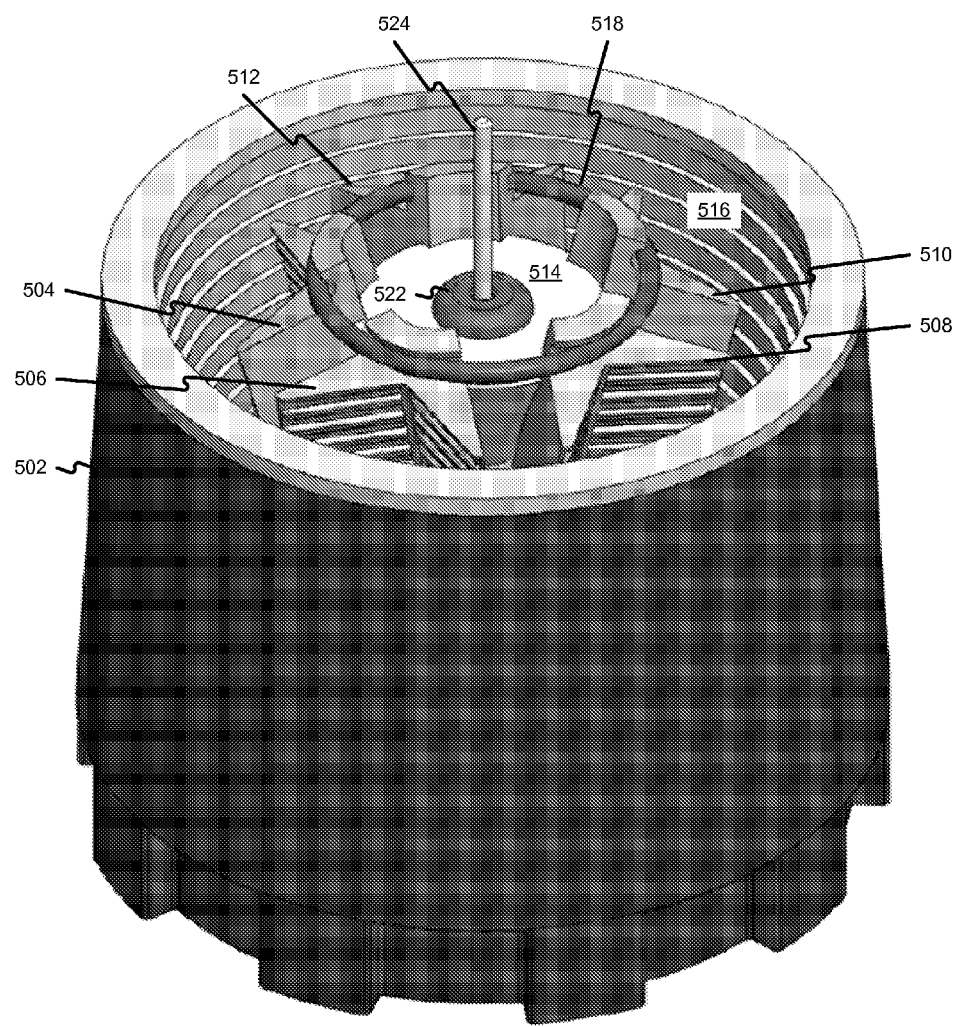
FIG. 6 shows a cable support.

As shown in FIG. 6, the plurality of compression segments may be located at least partially within body 502. Spreader 514 may be located between the plurality of compression elements. The plurality of compression elements may be held together with a top O-ring 518 and a bottom O-ring 520. Spreader 514 may include an eyelet 522. A joining member 524 may pass through eyelet 522, spreader 514, between the plurality of spreaders, and connect to a bottom stop 526. Bottom stop 526 may be located proximate the bottom of the plurality of compression segments.

During installation, wires may be passed through body 502. The plurality of compression segments may be inserted into body 502 with one or more wires between each of the compression segments and body 502. Joining member 524 may operate to cause the distance between spreader 514 and bottom stop 526 to decrease. As the distance decreases, the plurality of compression segments may move outward radially and compress the one or more wires between the plurality of compression segments and body 502.

The plurality of compression elements and body 502 may be manufactured out of metallic or polymer materials. Spreader 514 may be manufactured from a metallic, polymer, or an elastic material. For example, body 502 may be milled from aluminum, the plurality of compression elements may be an injection-molded polymer, and spreader 514 may be rubber.

Joining member 524 may be, for example, a bolt, a screw, a pop rivet, etc. For example, during installation, a user may insert a bolt through eyelet 522 that may engage threads located on bottom stop 526. As the user tightens the bolt, the conical shape of spreader 514 may act as a wedge and cause the plurality of compression members travel outward and grip wires.

Each of the plurality of compression segments may be a different size or may be sized to accommodate wires having different sizes. For example, first compression element 504 may be sized to accommodate a 4 gauge wire and the remaining compression elements may be sized to accommodate 8 gauge wires.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as examples for embodiments of the invention.

What is claimed is:

1. A cable support comprising:
   a mount;
   a drive support connected to the mount;
   a strap connected to the mount; and
   a drive block connected to the drive support by a drive bolt, the drive block having a gripping surface engaging the strap, the drive block being movable to cause at least one of the following: the strap to tighten and the strap to loosen, wherein the drive block being movable comprises the drive block being configured to traverse along an axis of rotation of the drive bolt when the drive bolt is rotated.

2. The cable support of claim 1, wherein the strap comprises a chain.

3. The cable support of claim 1, further comprising a protective strip located proximate the strap.

4. The cable support of claim 3, wherein the protective strip comprises an inner surface, an outer surface, and a plurality of flanges, the plurality of flanges being in contact with the strap.

5. The cable support of claim 1, further comprising a clamp connected to the mount, the clamp configured to engage a conduit.

6. The cable support of claim 1, wherein the mount comprises an upper mount member and a lower mount member, the drive support located between the upper mount member and the lower mount member.

7. The cable support of claim 1, wherein the mount is arcuately shaped.

8. The cable support of claim 1, wherein the mount comprises an arcuately shaped upper mount member and an arcuately shaped lower mount member.

9. The cable support of claim 8, wherein the drive support is disposed between the upper mount member and the lower mount member.

10. The cable support of claim 8, wherein the strap is secured between the upper mount member and the lower mount member by a strap retention pin.

11. The cable support of claim 8, wherein a hinge spacer is disposed between the upper mount member and the lower mount member.

12. The cable support of claim 8, wherein a hinge spacer is disposed between the upper mount member and the lower mount member by a spacer bolt.

13. The cable support of claim 8, wherein a spacer block is disposed between the upper mount member and the lower mount member.

14. The cable support of claim 8, wherein a spacer block is disposed between the upper mount member and the lower mount member by a first screw and a second screw.

15. A cable support comprising:
 a mount comprising an upper mount member and a corresponding lower mount member, the upper mount member being arcuately shaped and the lower mount member being arcuately shaped;
 a drive support disposed between the upper mount member and the lower mount member;
 a strap connected to the mount between the upper mount member and the lower mount member;
 a spacer block connected to the mount between the upper mount member and the lower mount member; and
 a drive block connected to the drive support and by a drive bolt, the drive block engaging the strap, the drive block being movable to cause at least one of the following: the strap to tighten on a cable placed between the strap and the spacer block and the strap to loosen on the cable placed between the strap and the spacer block.

16. The cable support of claim 15, wherein the drive block being movable comprises the drive block being configured to traverse along an axis of rotation of the drive bolt when the drive bolt is rotated.

17. The cable support of claim 15, wherein the strap is secured between the upper mount member and the lower mount member by a strap retention pin.

18. The cable support of claim 15, wherein a hinge spacer is disposed between the upper mount member and the lower mount member.

19. The cable support of claim 15, wherein a hinge spacer is disposed between the upper mount member and the lower mount member by a spacer bolt.

20. The cable support of claim 15, wherein the drive block comprises a gripping surface engaging the strap.

* * * * *